(12) United States Patent
Hasegawa et al.

(10) Patent No.: US 9,438,081 B2
(45) Date of Patent: Sep. 6, 2016

(54) CANNED TYPE ROTATING ELECTRICAL MACHINE

(75) Inventors: Takeshi Hasegawa, Aioi (JP); Naoki Miyake, Kobe (JP); Takeshi Oguri, Anpachi-gun (JP)

(73) Assignee: KAWASAKI JUKOGYO KABUSHIKI KAISHA, Kobe-shi (JP)

( * ) Notice: Subject to any disclaimer, the term of this patent is extended or adjusted under 35 U.S.C. 154(b) by 413 days.

(21) Appl. No.: 14/006,508

(22) PCT Filed: Mar. 22, 2012

(86) PCT No.: PCT/JP2012/001962
§ 371 (c)(1),
(2), (4) Date: Oct. 25, 2013

(87) PCT Pub. No.: WO2012/127866
PCT Pub. Date: Sep. 27, 2012

(65) Prior Publication Data
US 2014/0054992 A1   Feb. 27, 2014

(30) Foreign Application Priority Data
Mar. 23, 2011   (JP) ................................ 2011-063848

(51) Int. Cl.
*H02K 5/12*   (2006.01)
*H02K 5/128*   (2006.01)
*H02K 7/14*   (2006.01)

(52) U.S. Cl.
CPC ............. *H02K 5/128* (2013.01); *H02K 7/14* (2013.01)

(58) Field of Classification Search
CPC .......... H02K 5/12; H02K 5/128; H02K 5/15; H02K 5/1672; H02K 5/22; F04D 13/0613; F04D 13/0606; F04D 29/5806; F04D 29/588; F04D 29/0465; F04D 13/0633; F04D 29/048; F16C 32/0448; F16C 32/047; F16C 32/0489
USPC ........ 310/43, 45, 86, 87; 417/365, 366, 368, 417/369, 370, 423.7, 423.12
See application file for complete search history.

(56) References Cited

U.S. PATENT DOCUMENTS

| | | | | |
|---|---|---|---|---|
| 3,128,712 A | * | 4/1964 | Sence | F04D 13/0613 310/86 |
| 3,143,676 A | * | 8/1964 | Niemkiewicz | F04D 13/0613 310/86 |
| 3,742,595 A | * | 7/1973 | Lykes | H02K 15/12 29/596 |
| 4,437,027 A | * | 3/1984 | Yamamoto | H02K 5/1285 310/43 |
| 4,496,866 A | * | 1/1985 | Yamamoto | H02K 5/1285 310/43 |
| 4,549,105 A | * | 10/1985 | Yamamoto | B22D 11/0401 310/43 |

(Continued)

FOREIGN PATENT DOCUMENTS

JP    A-6-105501    4/1994

*Primary Examiner* — Tran Nguyen
(74) *Attorney, Agent, or Firm* — Oliff PLC

(57) ABSTRACT

A rotating electrical machine according to the present invention includes a can formed in a tubular shape and made of fiber reinforced plastic. At least a part of a first end portion of the can is located on a radially outer side of an adhered portion of a first end member, and a resin-based adhesive is filled in a gap between the part of the first end portion and the adhered portion of the first end member. At least a part of a second end portion of the can is located on a radially outer side of an adhered portion of a second end member, and the resin-based adhesive is filled in a gap between the part of the second end portion and the adhered portion of the second end member.

6 Claims, 5 Drawing Sheets

(56) References Cited

U.S. PATENT DOCUMENTS 4,585,966 A * 4/1986 Nishida ................ H02K 5/1285
 277/630

4,780,953 A * 11/1988 Wheeler .............. H02K 5/1285
 29/525

* cited by examiner

CANNED TYPE ROTATING ELECTRICAL MACHINE

TECHNICAL FIELD

The present invention relates to a rotating electrical machine, such as an electric motor or a power generator, and particularly to a canned type rotating electrical machine in which a stator and a rotor are isolated from each other.

BACKGROUND ART

A canned type rotating electrical machine is used when an atmosphere between a rotor and a stator needs to be divided. In the canned type rotating electrical machine, the atmosphere in which the stator and the rotor are housed can be divided by a tubular member, called a can.

In consideration of the permeability of magnetic flux, a non-magnetic material needs to be used as the material of the can used in the canned type rotating electrical machine (in the case of metal, SUS316, for example). However, in the case of using the can made of metal, heat is generated on the can by eddy currents generated in accordance with magnetic field rotation of the stator, and this causes energy loss (can loss). Especially when the rotating speed is high, influences by this energy loss are significant and unignorable. Therefore, as the material of the can, it is desirable to use fiber reinforced plastic that is a non-magnetic electrical-insulating material.

PTL 1 explains that it has been discussed that the can is made of synthetic resin that excels in an electrical insulating property and corrosion resistance (paragraph 0006). In addition, PTL1 further explains that "Using the resin is advantageous in that the resin does not rust, and the resin is less likely to expand with heat than the metal. However, the resin cannot be fixed by welding to an inner periphery of the stator iron core and the reinforcing tube. Therefore, there is no choice but to use a seal structure using O rings at both end portions of the can. In the case of using the seal structure using the O rings, synthetic resin has problems regarding circularity and the like. In addition, the carbon-based synthetic resin is still in the process of development, so that it is considerably difficult to produce a thin can having a large bore and high circularity. Therefore, at present, there is no choice but to depend on the can made of metal" (paragraph 0007).

CITATION LIST

Patent Literature

PTL 1: Japanese Laid-Open Patent Application Publication No. 6-105501

SUMMARY OF INVENTION

Technical Problem

An additional explanation of PTL 1 will be provided. In the case of producing a can made of fiber reinforced plastic, it is practically impossible to form an outer edge of the can in a true circle shape since, for example, it is difficult to uniformize a deformation amount in a thermal curing step. Further, in a case where an O ring is used at a portion not having a true circle shape but having a concave-convex surface, it cannot achieve an adequate seal performance. Therefore, it is difficult to realize complete sealing by the combination of the can made of the fiber reinforced plastic and the O ring. As above, although the advantage obtained by forming the can using the fiber reinforced plastic in the canned type rotating electrical machine has been known, forming the can using the fiber reinforced plastic is not used in practice because of production problems, such as no secure sealing method.

The present invention was made to solve the above problems, and an object of the present invention is to provide a canned type rotating electrical machine in which a can made of fiber reinforced plastic can be used in practice

Solution to Problem

The present invention was made to solve the above problems, and a canned type rotating electrical machine according to the present invention is a canned type rotating electrical machine including an isolation unit configured to isolate a rotor from a stator, wherein: the isolation unit includes a can located between the rotor and the stator, formed in a tubular shape, and made of fiber reinforced plastic, a first end member located on a first end portion side of the can and made of metal, and a second end member located on a second end portion side of the can and made of metal; each of the first end member and the second end member includes an annular fixed portion fixed to a casing and a cylindrical adhered portion adhered to the can; at least a part of the first end portion of the can is located on a radially outer side of the adhered portion of the first end member, and a resin-based adhesive is filled in a gap between the part of the first end portion and the adhered portion of the first end member; and at least a part of the second end portion of the can is located on a radially outer side of the adhered portion of the second end member, and the resin-based adhesive is filled in a gap between the part of the second end portion and the adhered portion of the second end member.

According to this configuration, since the adhesive is filled in the gap between the can and the first end member and the gap between the can and the second end member, the adhesive can seal the above gaps while filling irregularities on the surface of the can. In addition, the can made of fiber reinforced plastic having a low coefficient of thermal expansion is located on a radially outer side of the first end member and the second end member each made of metal having a high coefficient of thermal expansion. Therefore, in a case where heat for thermally hardening the adhesive is applied entirely, the gap between the can and the first end member and the gap between the can and the second end member gradually become small. As a result, the adhesive that has nowhere to go gets into small irregularities and gaps on the surface of the can. Thus, the seal performance by the adhesive can be improved. As above, according to the above configuration, the high seal performance can be secured at the gap between the can and the first end member and the gap between the can and the second end member.

In the canned type rotating electrical machine, a through hole penetrating the first end member in an axial direction and having a diameter larger than an outer diameter of the rotor may be formed at the first end member, and at the time of assembly, the rotor may be inserted through the through hole to be arranged inside the can. According to this configuration, the rotor can be inserted through the through hole. Therefore, even in a case where the can and the first end member are fixed to each other by the adhesive in advance, and the can and the second end member are fixed to each other by the adhesive in advance, the rotating electrical machine can be assembled without any problems.

In the canned type rotating electrical machine, the first end portion of the can may be located on an axially outer side of the rotor and the stator, and an inner diameter and outer diameter of the first end portion may be larger than those of a middle portion, sandwiched between the rotor and the stator, of the can. According to this configuration, the performance of the rotating electrical machine is maintained by forming the middle portion of the can such that the inner diameter and outer diameter of the middle portion become small, and in addition, the rotating electrical machine can be assembled without any problems by forming the first end portion coupled to the first end member such that the inner diameter and outer diameter of the first end portion become large.

In the canned type rotating electrical machine, it is desirable that the can be made of carbon fiber reinforced plastic. According to this configuration, since the can is made of carbon fiber reinforced plastic, it is high in stiffness, so that it can be reduced in thickness. As a result, the distance between the stator and the rotor can be reduced, so that the efficiency of the rotating electrical machine can be improved.

In the canned type rotating electrical machine, at least one of the first end member and the second end member may include an expansion joint located between the fixed portion and the adhered portion and configured to expand and contract in the axial direction, and a distance between the fixed portion and the adhered portion located on both sides of the expansion joint may be variable. The coefficient of thermal expansion of the isolation unit is different from that of the casing. Therefore, when heat is applied to both the isolation unit and the casing by the operation of the rotating electrical machine, a force of pulling or compressing the isolation unit in the axial direction is applied to the isolation unit from the casing. However, according to the above configuration, since the expansion joint of the isolation unit can absorb the force from the casing, break due to heat expansion does not occur.

Advantageous Effects of Invention

As described above, according to the canned type rotating electrical machine of the present invention, the high seal performance can be secured at the gap between the can and the first end member and the gap between the can and the second end member. Therefore, it is possible to provide the rotating electrical machine in which the can made of fiber reinforced plastic can be used in practice.

DESCRIPTION OF EMBODIMENTS

Hereinafter, embodiments of a rotating electrical machine according to the present invention will be explained in reference to the drawings. In the following explanations and drawings, the same reference signs are used for the same or corresponding components, and a repetition of the same explanation is avoided.

Embodiment 1

First, a canned type rotating electrical machine 100 according to Embodiment 1 will be explained in reference to FIGS. 1 to 5.

Configuration of Rotating Electrical Machine

The configuration of the canned type rotating electrical machine 100 according to the present embodiment will be explained in reference to FIG. 1. The rotating electrical machine 100 according to the present embodiment is a turbine power generator used for binary cycle power generation. The binary cycle power generation is power generation performed by utilizing heat of, for example, hot water (steam) of 80 to 120° C. although such hot water has been low in utility value as energy because of its low temperature. In the binary cycle power generation, a low-boiling medium, such as alternative freon, is used as a working medium, and a canned turbine power generator is used to prevent the low-boiling medium from leaking from a rotor side to a stator side.

Figure 1:
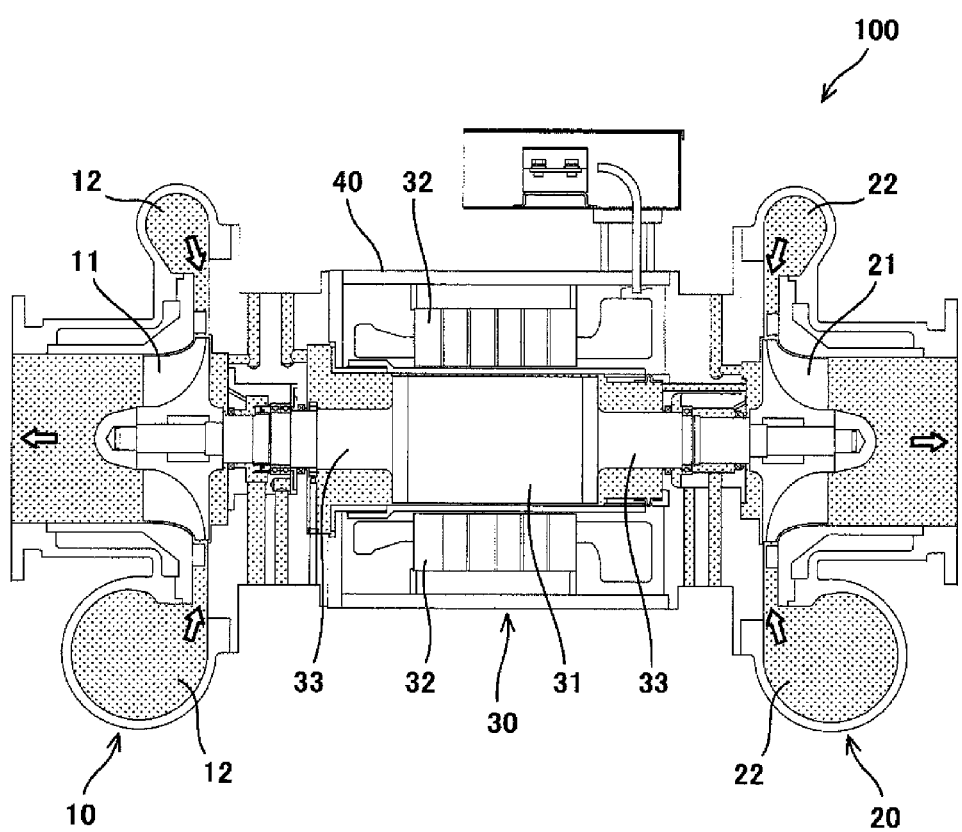
FIG. 1 is a cross-sectional view of a rotating electrical machine according to Embodiment 1 of the present invention.

FIG. 1 is a cross-sectional view of the rotating electrical machine 100 according to the present embodiment. As shown in FIG. 1, the rotating electrical machine 100 according to the present embodiment is mainly constituted by a first turbine portion 10, a second turbine portion 20, and an electric power generating portion 30. The first turbine portion 10 and the second turbine portion 20 sandwich the electric power generating portion 30 to be arranged symmetrically to the electric power generating portion 30. The configurations of the first turbine portion 10 and the second turbine portion 20 are basically the same as each other. The first turbine portion 10 and the second turbine portion 20 respectively include impellers 11 and 21. As shown by arrows in FIG. 1, the impellers 11 and 21 are rotated in such a manner that: the vaporized low-boiling medium flows from steam chambers 12 and 22 into the impellers 11 and 21, respectively; and then the vaporized low-boiling medium flows outward in an axial direction. In the present embodiment, the rotating electrical machine 100 includes two turbine portions 10 and 20. However, the rotating electrical machine 100 may be configured to include only the first turbine portion 10, for example. Further, the electric power generating portion 30 is located between the first turbine portion 10 and the second turbine portion 20 and generates electric power by a rotational movement energy input from the first turbine portion 10 and the second turbine portion 20. Details of the electric power generating portion 30 are as follows.

Configuration of Electric Power Generating Portion

Figure 2:
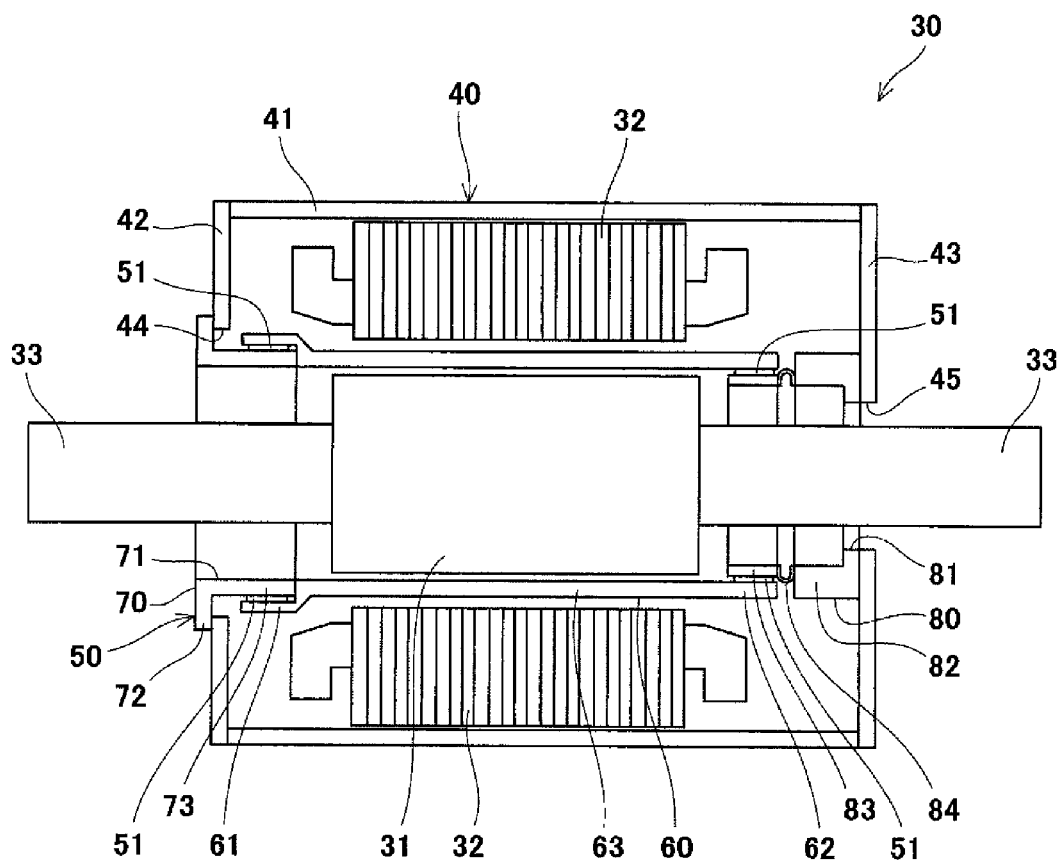
FIG. 2 is a schematic diagram of an electric power generating portion according to Embodiment 1 of the present invention.

Hereinafter, the configuration of the electric power generating portion 30 according to the present embodiment will be explained in reference to FIG. 2. FIG. 2 is a schematic diagram of the electric power generating portion 30 according to the present embodiment. As shown in FIG. 2, the electric power generating portion 30 according to the present embodiment includes a rotor 31, a stator 32, a casing 40, and an isolation unit 50. Hereinafter, these components will be explained in order.

The rotor 31 is a member configured to be rotatable inside the electric power generating portion 30. The rotor 31 according to the present embodiment includes an input shaft 33 extending in the axial direction through the inside of the rotor 31. The impellers 11 and 21 are respectively attached to both ends of the input shaft 33. With this configuration, the rotor 31 rotates in accordance with the rotations of the impellers 11 and 21. Other than the above, the rotor 31 according to the present embodiment is the same in configuration as a typical rotor.

The stator 32 is a member fixed at a radially outer side of the rotor 31. An electromotive force is generated at the stator 32 in accordance with the rotation of the rotor 31. Thus, the electric power is generated. Other than the above, the stator 32 according to the present embodiment is the same in configuration as a typical stator.

The casing 40 is a member configured to form an outer shell of the electric power generating portion 30. The casing 40 according to the present embodiment includes: a tubular portion 41 located on a radially outer side of the stator 32; a disc-shaped (or tubular) first side portion 42 located on one end side (left side on the sheet of FIG. 2) of the tubular portion 41; and a disc-shaped (or tubular) second side portion 43 located on the other end side (right side on the sheet of FIG. 2) of the tubular portion 41. A first opening hole 44 is formed at the first side portion 42, and a second opening hole 45 is formed at the second side portion 43. The first opening hole 44 is formed such that a diameter thereof is larger than that of the second opening hole 45. The casing 40 is made of a metal material.

The isolation unit 50 is a component configured to isolate the rotor 31 and the stator 32 from each other. As shown in FIG. 2, the isolation unit 50 is located on a radially inner side of the casing 40. The isolation unit 50 and the casing 40 cover the entire stator 32. In other words, a circular space in which the stator 32 is provided is formed by the casing 40 and the isolation unit 50. Details of the isolation unit 50 are as follows.

Configuration of Isolation Unit

Hereinafter, the isolation unit 50 according to the present embodiment will be explained in reference to FIG. 2. As shown in FIG. 2, the isolation unit 50 according to the present embodiment includes a can 60, a first end member 70, a second end member 80. Hereinafter, these components will be explained in order.

Configuration of Can

The can 60 is a member located between the rotor 31 and the stator 32 and formed in a tubular shape. An axial size of the can 60 is larger than that of each of the rotor 31 and the stator 32. Therefore, each of a first end portion 61 (portion on the left side of the sheet of FIG. 2) and second end portion 62 (portion on the right side of the sheet of FIG. 2) of the can 60 is located on an axially outer side of the rotor 31 and the stator 32. Further, the can 60 according to the present embodiment is made of fiber reinforced plastic (hereinafter referred to as "FRP").

Here, it is desirable that the thickness of the can 60 be as small as possible. This is because in a case where the thickness of the can 60 is small, the rotor 31 and the stator 32 can be arranged such that a distance (air gap) between the rotor 31 and the stator 32 becomes small, so that the power generation efficiency can be improved. However, to obtain a required strength, the can 60 needs to have a certain thickness or more. Therefore, it is desirable that a middle portion 63, opposed to the rotor 31 and the stator 32, of the can 60 be set to have a constant thickness and a minimum thickness having a required strength. The can 60 of the present embodiment is formed such that the middle portion 63, the first end portion 61, and the second end portion 62 have the same thickness as one another. However, for example, the can 60 may be formed such that each of the first end portion 61 and the second end portion 62 has a thickness larger or smaller than the thickness of the middle portion 63.

Regarding the inner diameter of the can 60, the middle portion 63 and the second end portion 62 are formed such that the inner diameters thereof become constant. Further, the middle portion 63 (second end portion 62) is formed such that the inner diameter thereof becomes as small as possible. The purpose of this is to reduce the distance (air gap) between the rotor 31 and the stator 32 by reducing the distance between the rotor 31 and the middle portion 63. Furthermore, the first end portion 61 of the can 60 is formed such that the inner diameter thereof becomes larger than that of each of the middle portion 63 and the second end portion 62. The purpose of this is to increase the diameter of a first through hole 71 formed at the first end member 70. Details will be described below. Since the first end portion 61 of the can 60 is located on an axially outer side of the rotor 31 and the stator 32, the air gap problem does not occur even if the inner diameter of the first end portion 61 is increased.

The first end portion 61 of the can 60 is formed such that the outer diameter thereof becomes smaller than the diameter of the first opening hole 44 formed at the casing 40. In other words, the first opening hole 44 of the casing 40 is formed such that the diameter thereof becomes larger than the outer diameter of the first end portion 61 of the can 60. The purpose of this configuration is to allow the can 60 to pass through the first opening hole 44 when assembling the rotating electrical machine 100. The outline of a method of assembling the rotating electrical machine 100 (electric power generating portion 30) will be described below.

As described above, the can 60 according to the present embodiment is made of the FRP. As fibers inserted into the FRP, glass fibers, aramid fibers, or the like may be adopted. Carbon fibers are desirable as the fibers inserted into the FRP. To be specific, it is desirable that the can 60 be made of carbon fiber reinforced plastic (hereinafter referred to as "CFRP"). The CFRP is higher in stiffness than the other FRP. Therefore, the can 60 can be reduced in thickness, and therefore, the power generation efficiency can be further improved.

Figure 3:
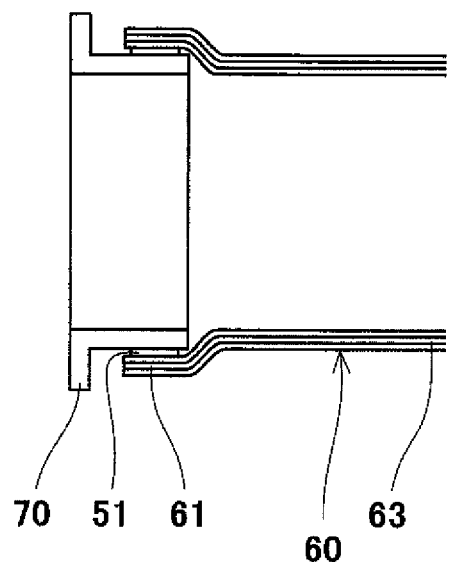
FIG. 3 is an enlarged view of a first end portion of a can according to Embodiment 1 of the present invention.
Figure 4:
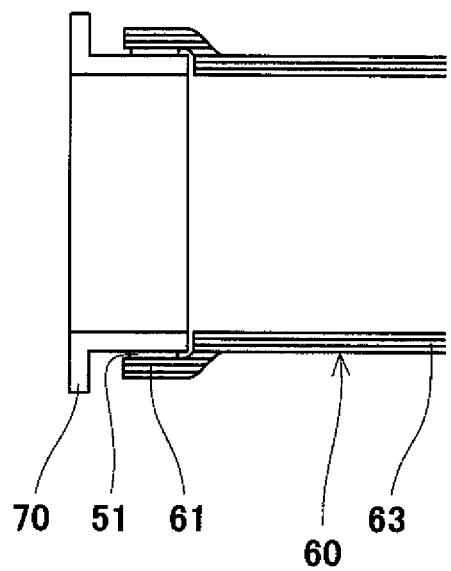
FIG. 4 is an enlarged view of a first end portion of the can according to Modification Example of Embodiment 1 of the present invention.

The can 60 according to the present embodiment can be produced in such a manner that a sheet-shaped prepreg prepared by impregnating a fibrous material with resin is wound around a columnar core die to be stacked on the core die, and then is heated to be hardened. At this time, as shown in FIG. 3, by using the same prepreg for the middle portion 63 and first end portion 61 of the can 60, it is possible to form the can 60 in which the fibers are continuous from the middle portion 63 to the first end portion 61. Therefore, the axial strength of the can 60 can be increased. Instead of the stacking method shown in FIG. 3, as shown in FIG. 4, the can 60 may be formed in such a manner that the middle portion 63 (and the second end portion 62) is formed by a cylindrical member having a constant diameter, and another prepreg is stacked on the cylindrical member so as to form a step at a portion from the vicinity of the first end portion 61 to the first end portion 61. A unidirectional prepreg, a fabric prepreg, or a combination of these may be used as the sheet-shaped prepreg. In the present embodiment, the sheet-shaped prepreg is used since it is easily stacked. However, a tape-shaped prepreg may be used. To form a tubular member by the tape-shaped prepreg, the tape-shaped prepreg needs to be wound around the core die little by little. Since the tape-shaped prepreg is small in width, it has an advantage that a complex shape can be easily formed.

Configuration of First End Member

The first end member 70 is a member located on the first end portion 61 side of the can 60. The first end member 70 is made of a metal material. The first end member 70 according to the present embodiment is a so-called flange pipe. The first through hole 71 penetrating the first end member 70 in the axial direction is formed at the first end member 70. The first end member 70 includes a first fixed portion 72 and a first adhered portion 73.

The first fixed portion 72 corresponds to a flange portion of the flange pipe, has an annular shape, and is located outside the casing 40. The first fixed portion 72 is formed such that the outer diameter thereof becomes larger than the diameter of the first opening hole 44 formed at the casing 40. Therefore, the first fixed portion 72 cannot pass through the first opening hole 44. The first fixed portion 72 is welded to an outer surface of the casing 40 (first side portion 42) or fixed by bolts and nuts to the outer surface of the casing 40 (first side portion 42).

The first adhered portion 73 corresponds to a tube portion of the flange pipe, has a cylindrical shape, and located inside the casing 40. An outer peripheral surface of the first adhered portion 73 is formed to have a circular cross section. The first end portion 61 of the can 60 is located on a radially outer side of the first adhered portion 73. A resin-based adhesive 51 is filled in a gap between the first adhered portion 73 and the first end portion 61 of the can 60. The adhesive 51 is not especially limited. An epoxy resin-based adhesive, a silicone-based adhesive, a phenol resin-based adhesive, a polyimide-based adhesive, or the like may be used as the adhesive 51.

By filling the adhesive 51 in the gap between the can 60 and the outer peripheral surface of the first end member 70 as above, the gap between the can 60 and the first end member 70 can be sealed such that the adhesive 51 fills irregularities on the surface of the can 60 made of the FRP. Then, since the first end portion 61 of the can 60 is located on a radially outer side of the first adhered portion 73, the seal performance is further improved. The reason for this is as follows. To be specific, a coefficient of thermal expansion of the first end member 70 made of metal is higher than that of the can 60 made of the FRP. Therefore, in a case where heat for thermally hardening the adhesive 51 is applied to the can 60 and the first end member 70, the gap therebetween gradually becomes small, and the adhesive 51 fits well to fine irregularities on the surface of the can 60. As a result, the high seal performance by the adhesive 51 can be secured. In addition, the adhesive 51 is filled in a band shape having a predetermined width in the axial direction. With this, the higher seal performance can be secured, and the durability of the portion in which the adhesive 51 is filled can be improved.

In the present embodiment, the adhesive 51 is used as a sealing material as above. However, in this case, unlike a case where an O ring is used as the sealing material, an assembling problem occurs, that is, the rotor 31 needs to be inserted into the can 60 in which the first end member 70 and the second end member 80 are fixed. Especially, in the present embodiment, it is necessary to consider that the can 60 is located on a radially outer side of the first end member 70. More specifically, for example, if the first end member 70 is increased in size such that the rotor 31 can pass therethrough, the inner diameter and outer diameter of the can 60 also increase in size, and the air gap also increases in size, so that the performance of the rotating electrical machine 100 may deteriorate. Here, in the present embodiment, the air gap is made small by reducing the inner diameter of the middle portion 63 of the can 60 as described above, and the rotor 31 can be inserted into the first end portion 61 of the can 60 by increasing the inner diameter of the first end portion 61. With this, the rotating electrical machine 100 can be assembled without deteriorating the performance of the rotating electrical machine 100.

Configuration of Second End Member

The second end member 80 is a member located on the second end portion 62 side of the can 60. The second end member 80 is made of a metal material. The second end member 80 according to the present embodiment is a so-called flange pipe. A second through hole 81 penetrating the second end member 80 in the axial direction is formed at the second end member 80. The second end member 80 includes a second fixed portion 82, a second adhered portion 83, and an expansion joint 84 located between the second fixed portion 82 and the second adhered portion 83.

The second fixed portion 82 corresponds to a flange portion of the flange pipe, has an annular shape, and is located inside the casing 40. Since the outer diameter of the second fixed portion 82 is smaller than the diameter of the first opening hole 44 formed at the casing 40, the second fixed portion 82 (second end member 80) can pass through the first opening hole 44. In contrast, since the outer diameter of the second fixed portion 82 is larger than the diameter of the second opening hole 45 formed at the casing 40, the second fixed portion 82 (second end member 80) cannot pass through the second opening hole 45. The second fixed portion 82 is welded to an inner surface of the casing 40 (second side portion 43) or fixed by bolts and nuts to the inner surface of the casing 40 (second side portion 43).

The second adhered portion 83 corresponds to a tube portion of the flange pipe, has a cylindrical shape, and located inside the casing 40. An outer peripheral surface of the second adhered portion 83 is formed to have a circular cross section. The second end portion 62 of the can 60 is located on a radially outer side of the second adhered portion 83. An effect obtained when the second end portion 62 of the can 60 is located on the radially outer side of the second adhered portion 83 is the same as that obtained when the first end portion 61 of the can 60 is located on a radially outer side of the first adhered portion 73. Then, the resin-based adhesive 51 is filled in the gap between the second adhered portion 83 and the can 60, and the adhesive 51 is filled in a band shape having a predetermined width in the axial direction. An effect obtained when the adhesive 51 is used as the sealing material in the gap between the second end member 80 made of metal and the can 60 made of the FRP is also the same as above.

The expansion joint 84 is a member formed so as to be able to expand and contract in the axial direction. The expansion joint 84 according to the present embodiment is formed in a circular shape and couples the second fixed portion 82 to the second adhered portion 83. The expansion joint 84 is formed such that a metal thin plate is bent so as to have a U-shaped cross section. When the expansion joint 84 deforms to expand or contract in the axial direction, the axial distance between the second fixed portion 82 and the second adhered portion 83 changes. In addition, when the expansion joint 84 expands or contracts, the axial size of the entire isolation unit 50 changes. The expansion joint 84 is not limited to the above configuration. For example, a component having an accordion shape formed by stacking a plurality of members each having a U-shaped cross section may be used as the expansion joint 84, or a component capable of expanding and contracting in the axial direction may be used as the expansion joint 84.

An operational advantage obtained in a case where the second end member 80 includes the expansion joint 84 is as follows. To be specific, the coefficient of thermal expansion of the casing 40 made of metal is higher than that of the isolation unit 50 including the can 60 made of the FRP. Therefore, when the rotating electrical machine 100 starts operating, and heat is transferred to respective components, a force of pulling or compressing the isolation unit 50 in the axial direction is applied from the casing 40 to the isolation unit 50. On this account, if there is no expansion joint 84, there is a possibility that a significant shear stress is generated at the portion in which the adhesive 51 is filled, and the adhesive 51 comes off. In contrast, according to the present embodiment, even if the force of pulling or compressing the isolation unit 50 is applied to the isolation unit 50 in the axial direction, the expansion joint 84 expands or contracts to absorb the force, so that the adhesive 51 does not come off.

Assembling Method

Figure 5:
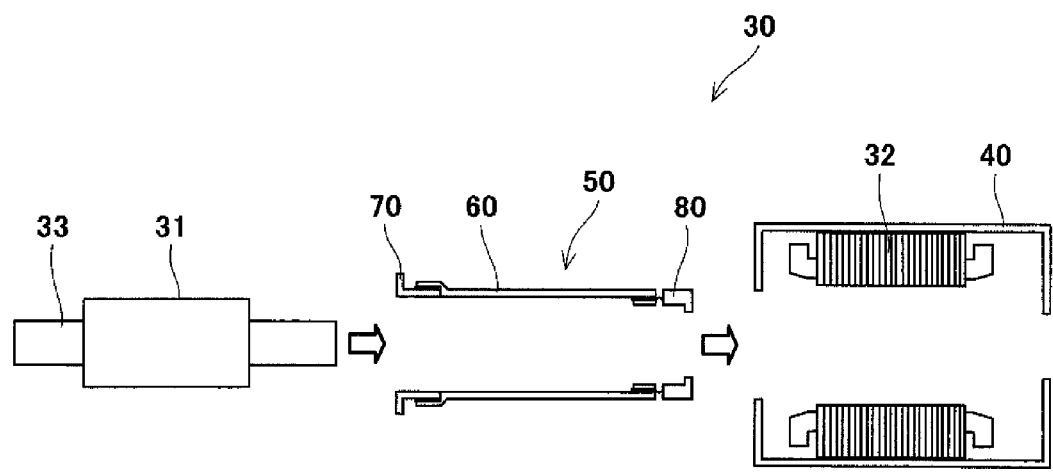
FIG. 5 is an exploded view of the electric power generating portion according to Embodiment 1 of the present invention.

Next, a method of assembling the electric power generating portion 30 according to the present embodiment will be simply explained in reference to FIG. 5. FIG. 5 is an exploded view of the electric power generating portion 30 according to the present embodiment. As shown in FIG. 5, first, the casing 40 to which the stator 32 is attached, the isolation unit 50 formed by integrating the first end member 70, the can 60, and the second end member 80, and the rotor 31 including the input shaft 33 are produced in advance.

Then, the isolation unit 50 is inserted into the casing 40 through the first opening hole 44 of the casing 40. As described above, since the isolation unit 50 except for the first fixed portion 72 of the first end member 70 is smaller in diameter than the first opening hole 44, the isolation unit 50 can be inserted into the casing 40 through the first opening hole 44. Then, the first fixed portion 72 of the first end member 70 is welded to the outer surface of the casing 40 (first side portion 42) or fixed by bolts and nuts to the outer surface of the casing 40 (first side portion 42), and the second fixed portion 82 of the second end member 80 is welded to the inner surface of the casing 40 (second side portion 43) or fixed by bolts and nuts to the inner surface of the casing 40 (second side portion 43).

Then, the rotor 31 is inserted through the first through hole 71 of the first end member 70 to be located inside the can 60. As described above, since the outer diameter of the rotor 31 is smaller than the diameter of the first through hole 71 formed at the first end member 70, the rotor 31 can be inserted through the first through hole 71 of the first end member 70. By the above procedure, the electric power generating portion 30 can be assembled.

As above, according to the present embodiment, even after the can 60 and the first end member 70 are fixed to each other by the adhesive 51, and the can 60 and the second end member 80 are fixed to each other by the adhesive 51, the rotor 31 can be inserted into the can 60. To be specific, according to the present embodiment, even in a case where the adhesive 51 is used to seal the gap between the can 60 and the first end member 70 and the gap between the can 60 and the second end member 80, the electric power generating portion 30 can be assembled without any problems, and therefore, the rotating electrical machine 100 can be assembled without any problems.

The foregoing has explained the rotating electrical machine 100 according to the present embodiment. As described above, according to the canned type rotating electrical machine 100 of the present embodiment, although the can 60 made of the FRP is being used, the gap between the can 60 and the first end member 70 and the gap between the can 60 and the second end member 80 can be surely sealed, and the rotating electrical machine 100 can be assembled without any problems. Therefore, according to the rotating electrical machine 100 of the present embodiment, the can 60 made of the FRP can be used in practice.

Embodiment 2

Next, a canned type rotating electrical machine 200 according to Embodiment 2 will be explained. In the rotating electrical machine 200 according to the present embodiment, the first end portion 61 of the can 60 is different in shape from that of the rotating electrical machine 100 according to Embodiment 1. The other components are the same as those of the rotating electrical machine 100 according to Embodiment 1. Hereinafter, the shape of the can 60 that is different from that of the rotating electrical machine 100 according to Embodiment 1 will be explained.

Figure 6:
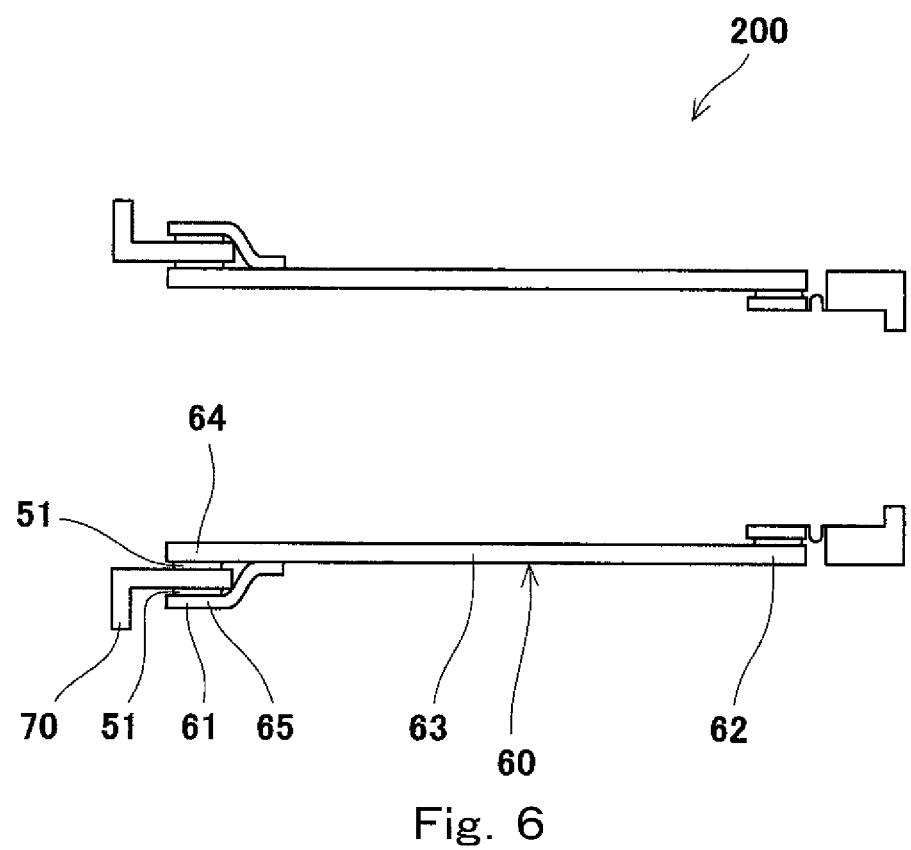
FIG. 6 is a cross-sectional view of the can according to Embodiment 2 of the present invention.

FIG. 6 is a cross-sectional view of the can 60 according to the present embodiment. As shown in FIG. 6, the first end portion 61 of the can 60 according to the present embodiment is doubly formed. In the first end portion 61, an inner peripheral portion 64 located on an inner side is located on a radially inner side of the first adhered portion 73, and an outer peripheral portion 65 located on an outer side is located outside the first adhered portion 73. Then, the adhesive 51 is filled in a gap between the first adhered portion 73 and the inner peripheral portion 64 and a gap between the first adhered portion 73 and the outer peripheral portion 65. In the can 60 according to the present embodiment, the inner peripheral portion 64 of the first end portion 61, the middle portion 63, and the second end portion 62 are formed by a cylindrical member in which the fibrous materials are continuous in the axial direction. Such a cylindrical member can secure high strength in the axial direction. In addition, since the shape of the cylindrical member is simple, the cylindrical member can be comparatively easily produced. Then, the cylindrical member is fixed to an inner side of the first end member 70 by the adhesive 51, and at this time, a sheet-shaped prepreg is stacked on an outer side of the first end member 70 so as to cover the first end member 70 while sandwiching the adhesive 51. Then, these components are heated to be hardened. Thus, the prepreg stacked on the first end member 70 so as to cover the first end member 70 is formed as the outer peripheral portion 65 of the first end portion 61.

The foregoing has explained the rotating electrical machine 200 according to the present embodiment. In the present embodiment, a part (the outer peripheral portion 65) of the first end portion 61 of the can 60 is located on a radially outer side of the first end member 70, and the resin-based adhesive 51 is filled in the gap between the outer peripheral portion 65 and the first end member 70. To be specific, as with the rotating electrical machine 100 of Embodiment 1, according to the rotating electrical machine 200 of the present embodiment, although the can 60 made of the FRP is being used, the gap between the can 60 and the first end member 70 and the gap between the can 60 and the second end member 80 can be surely sealed, and the rotating electrical machine 200 can be assembled without any problems. Therefore, according to the rotating electrical machine 200 of the present embodiment, the can 60 made of the FRP can be used in practice.

The foregoing has explained Embodiments 1 and 2 of the present invention in reference to the drawings. However, a specific configuration is not limited to these embodiments. Design modifications and the like within the spirit of the present invention are included in the present invention. For example, although the rotating electrical machines 100 and 200 according to Embodiments 1 and 2 are power generators, cases where the rotating electrical machines 100 and 200 according to Embodiments 1 and 2 are the other rotating electrical machines, such as electrical motors or motor generators, are included in the present invention.

In addition, although the foregoing has explained a case where only the second end member 80 includes the expansion joint 84, a case where one or each of both of the first end member 70 and the second end member 80 includes the expansion joint 84 is included in the present invention.

INDUSTRIAL APPLICABILITY

The present invention can provide the canned type rotating electrical machine in which the fiber reinforced plastic can be used in practice. Therefore, the present invention is useful in a technical field of rotating electrical machines.

REFERENCE SIGNS LIST

31 rotor
32 stator
40 casing
44 first opening hole
50 isolation unit
51 adhesive
60 can
61 first end portion
62 second end portion
63 middle portion
70 first end member
71 first through hole
72 first fixed portion
73 first adhered portion
80 second end member
81 second through hole
82 second fixed portion
83 second adhered portion
84 expansion joint
100, 200 rotating electrical machine

The invention claimed is:

1. A canned type rotating electrical machine comprising an isolation unit configured to isolate a rotor from a stator, wherein:
   the isolation unit includes
   a can located between the rotor and the stator, formed in a tubular shape, and made of fiber reinforced plastic,
   a first end member located on a first end portion side of a first end portion of the can and made of metal, and
   a second end member located on a second end portion side of a second end portion of the can and made of metal;
   each of the first end member and the second end member includes an annular fixed portion fixed to a casing and a cylindrical adhered portion adhered to the can;
   at least a part of the first end portion of the can is located on a radially outer side of the adhered portion of the first end member, and a resin-based adhesive is filled in a gap between the part of the first end portion and the adhered portion of the first end member; and
   at least a part of the second end portion of the can is located on a radially outer side of the adhered portion of the second end member, and the resin-based adhesive is filled in a gap between the part of the second end portion and the adhered portion of the second end member;
   wherein: a through hole penetrating the first end member in an axial direction and having a diameter larger than an outer diameter of a largest portion of the rotor is formed at the first end member.

2. The canned type rotating electrical machine according to claim 1, wherein:
   at the time of assembly, the rotor is inserted through the through hole to be arranged inside the can.

3. The canned type rotating electrical machine according to claim 2, wherein:
   the first end portion of the can is located on an axially outer side of the rotor and the stator; and
   an inner diameter and outer diameter of the first end portion are larger than those of a middle portion, sandwiched between the rotor and the stator, of the can.

4. The canned type rotating electrical machine according to any one of claims 1 to 3, wherein
   the can is made of carbon fiber reinforced plastic.

5. The canned type rotating electrical machine according to any one of claims 1 to 3, wherein:
   at least one of the first end member and the second end member includes an expansion joint located between the fixed portion and the adhered portion and configured to expand and contract in the axial direction; and
   a distance between the fixed portion and the adhered portion located on both sides of the expansion joint is variable.

6. The canned type rotating electrical machine according to claim 4, wherein:
   at least one of the first end member and the second end member includes an expansion joint located between the fixed portion and the adhered portion and configured to expand and contract in the axial direction; and
   a distance between the fixed portion and the adhered portion located on both sides of the expansion joint is variable.

* * * * *